United States Patent [19]

Sung

[11] Patent Number: 4,944,770
[45] Date of Patent: Jul. 31, 1990

[54] MOTOR FUEL ADDITIVE AND ORI-INHIBITED MOTOR FUEL COMPOSITION

[75] Inventor: Rodney L. Sung, Fishkill, N.Y.
[73] Assignee: Texaco, Inc., White Plains, N.Y.
[21] Appl. No.: 239,865
[22] Filed: Sep. 2, 1988
[51] Int. Cl.$^5$ .............................. C10L 1/18; C10L 1/22
[52] U.S. Cl. ............................................. 44/073; 44/75
[58] Field of Search .......................... 44/73, 75, 72, 62; 564/505, 299; 525/409; 528/421

[56] References Cited

U.S. PATENT DOCUMENTS

| | | | |
|---|---|---|---|
| 2,962,442 | 11/1960 | Andress | 44/73 |
| 4,083,699 | 4/1978 | Chibnik | 44/75 |
| 4,117,011 | 9/1978 | Molec | 44/73 |
| 4,166,726 | 9/1979 | Harle | 44/73 |
| 4,444,566 | 4/1984 | Crawford et al. | 44/72 |
| 4,526,587 | 7/1985 | Campbell | 44/73 |
| 4,553,979 | 11/1985 | Hanlon et al. | 44/73 |
| 4,747,851 | 5/1988 | Sung et al. | 44/72 |

FOREIGN PATENT DOCUMENTS

| | | | |
|---|---|---|---|
| 0647911 | 4/1962 | Canada | 44/73 |
| 2510046 | 11/1975 | Fed. Rep. of Germany | 44/73 |

*Primary Examiner*—William R. Dixon, Jr.
*Assistant Examiner*—Margaret B. Medley
*Attorney, Agent, or Firm*—Robert A. Kulason; James J. O'loughlin

[57] ABSTRACT

A motor fuel composition which inhibits engine ORI and resists engine deposit formation comprises a mixture of hydrocarbons boiling in the range of 90° F.–450° F. and the reaction product of an alkyl-substituted phenol, an aldehyde, and a polyoxyalkylene diamine.

9 Claims, No Drawings

MOTOR FUEL ADDITIVE AND ORI-INHIBITED MOTOR FUEL COMPOSITION

BACKGROUND OF THE INVENTION

1. Field of the Invention

This invention relates to a novel reaction product composition and a deposit- and ORI-inhibited motor fuel composition. More particularly, this invention relates to a reaction product composition obtained by reacting an alkyl-substituted phenol, an aldehyde, and a polyoxyalkylene diamine, and a deposit- and ORI-inhibited motor fuel composition containing such a reaction product.

2. Information Disclosure Statement

U.S. Pat. No. 4,006,089 (Chibnik) discloses the use of a Mannich base product as a detergent additive in lubricant or fuel compositions. The Mannich base product is the reaction product of a high molecular weight alkyl-substituted hydroxy aromatic compound, a polyoxyethylene polyamine, and an aldehyde.

Co-assigned U.S. patent application Ser. No. 07/245,591, filed Sept. 19, 1988, discloses a motor fuel composition comprising the reaction product of one or more aliphatic carboxylic acids and a polyoxyalkylene diamine, the motor fuel composition having reduced engine ORI.

Co-assigned U.S. patent application Ser. No. 211,937, filed June 27, 1988, discloses a motor fuel composition comprising the reaction product of (i) a hydrocarbyl-substituted dibasic acid anhydride and (ii) a polyoxyalkylene diamine and an optional polymeric component which is a polyolefin polymer/copolymer, or mixtures thereof, of a $C_2$–$C_{10}$ hydrocarbon.

Co-assigned U.S. patent application Ser. No. 84,354, filed Aug. 12, 1987 discloses a motor fuel composition comprising (I) the reaction product of the polyoxyalkylene diamine of co-assigned U.S. Pat. No. 4,747,851, a dibasic acid anhydride, and a hydrocarbyl polyamine, and (II) a mixture comprising polyisobutylene ethylene diamine and polyisobutylene in a hydrocarbon solvent.

Co-assigned U.S. patent application Ser. No. 000,230, filed Jan. 2, 1987 discloses a motor fuel composition comprising the reaction product of the polyoxyalkylene diamine of U.S. Pat. No. 4,747,851, a dibasic acid anhydride, and a hydrocarbyl polyamine. An optional additional polymer/copolymer additive with a molecular weight of 500–3500 may also be employed in conjunction with the reaction product additive.

Co-assigned U.S. Pat. No. 4,747,851 discloses a novel polyoxyalkylene diamine compound of the formula:

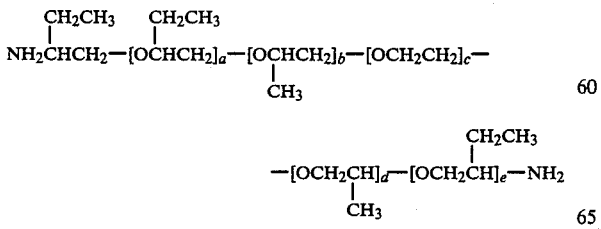

where c has a value from about 5–150, b+d has a value from about 5–150, and a+e has a value from about 2–12.

Motor fuel compositions comprising the novel polyoxyalkylene diamine, alone or in combination with a polymer/copolymer additive are also disclosed.

Co-assigned U.S. Pat. No. 4,659,337 discloses the use of the reaction product of maleic anhydride, a polyether polyamine containing oxyethylene and oxypropylene ether moieties, and a hydrocarbyl polyamine in a gasoline motor fuel to reduce engine ORI and provide carburetor detergency.

Co-assigned U.S. Pat. No. 4,659,336 discloses the use of the mixture of: (i) the reaction product of maleic anhydride, a polyether polyamine containing oxyethylene and oxypropylene ether moieties, and a hydrocarbyl polyamine; and (ii) a polyolefin polymer/copolymer as an additive in motor fuel compositions to reduce engine ORI.

U.S. Pat. No. 4,604,103 discloses a motor fuel deposit control additive for use in internal combustion engines which maintains cleanliness of the engine intake system without contributing to combustion chamber deposits or engine ORI. The additive disclosed is a hydrocarbyl polyoxyalkylene polyamine ethane of molecular weight range 300–2500 having the formula

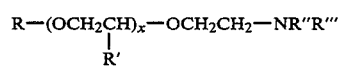

where R is a hydrocarbyl radical of from 1 to about 30 carbon atoms; R' is selected from methyl and ethyl; x is an integer from 5 to 30; and R" and R''' are independently selected from hydrogen and —($CH_2CH_2NH$—$)_y$—H where y is an integer from 0–5.

U.S. Pat. No. 4,198,306 (Lewis) discloses the use of hydrocarbyl poly (oxyalkylene) aminoesters which are monoesters of a hydrocarbyl-terminated poly (oxyalkylene) alcohol and a monocarboxylic $C_2$–$C_{20}$ (amino-substituted) alkanoic acid as an ORI-controlling additive in motor fuel compositions.

SUMMARY OF THE INVENTION

According to this invention, a novel reaction product which provides ORI-inhibiting and deposit-resisting properties to a motor fuel composition is obtained by reacting, at a temperature of 30° C.–200° C.:

(a) 0.5–2.5 moles of an alkyl-substituted phenol, most preferably dodecylphenol;

(b) 0.5–2.5 moles of an aldehyde, most preferably paraformaldehyde; and (c) 0.5–1.5 moles of a polyoxyalkylene diamine of the formula

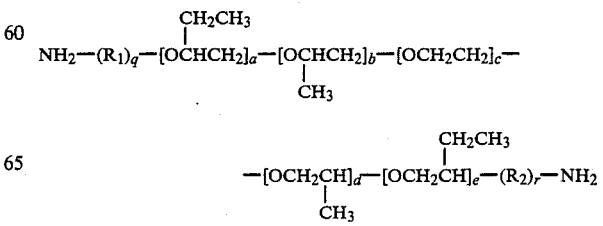

here $R_1$ and $R_2$ are $C_1$–$C_{12}$ alkylene groups, q and r are integers having a value of 0 or 1, c has a value from 2–150, b+d has a value from 2–150, and a+e has a value from 0–12. In the most preferred embodment, q=1, r=0, $R_1$ is a butylene group, c has a value of 2–50, b+d has a value of 2–50, and a+e has a value of 2–8.

The motor fuel composition of the instant invention comprises a mixture of hydrocarbons boiling in the range of 90° F.–450° F. comprising from about 0.0005–5.0 wt. % of the abovedescribed reaction product.

DETAILED EMBODIMENTS OF THE INVENTION

Combustion of a hydrocarbon motor fuel in an internal combustion engine generally results in the formation and accumulation of deposits on various parts of the combustion chamber as well as on the fuel intake and exhaust systems of the engine. The presence of deposits in the combustion chamber seriously reduces the operating efficiency of the engine. First, deposit accumulation within the combustion chamber inhibits heat transfer between the chamber and the engine cooling system. This leads to higher temperatures within the combustion chamber, resulting in increases in the end gas temperature of the incoming charge. Consequently, end gas auto-ignition occurs, which causes engine knock. In addition, the accumulation of deposits within the combustion chamber reduces the volume of the combustion zone, causing a higher than design compression ratio in the engine. This, in turn, also results in serious engine knocking. A knocking engine does not effectively utilize the energy of combustion. Moreover, a prolonged period of engine knocking will cause stress fatigue and wear in vital parts of the engine. The above-described phenomenon is characteristic of gasoline powered internal combustion engines. It is usually overcome by employing a higher octane gasoline for powering the engine, and hence has become known as the engine octane requirement increase (ORI) phenomenon. It would therefore be highly advantageous if engine ORI could be substantially reduced or eliminated by preventing or modifying deposit formation in the combustion chambers of the engine.

Another problem common to internal combustion engines relates to the accumulation of deposits in the carburetor which tend to restrict the flow of air through the carburetor at idle and at low speed, resulting in an overrich fuel mixture. This condition also promotes incomplete fuel combustion and leads to rough engine idling and engine stalling. Excessive hydrocarbon and carbon monoxide exhaust emissions are also produced under these conditions. It would therefore be desirable from the standpoint of engine operability and overall air quality to provide a motor fuel composition which minimizes or overcomes the abovedescribed problems.

It is one object of this invention to provide a reaction product composition which may be employed as a deposit-resisting and ORI-inhibiting additive in motor fuel compositions. It is another object of this invention to provide a motor fuel composition which exhibits deposit-resistance and ORI-inhibition when employed in an internal combustion engine.

It is a feature of motor fuel compositions of the instant invention that combustion chamber deposit formation is minimized, with concomitant reduction of engine ORI.

It is an advantage that motor fuel compositions of the instant invention exhibit reduced deposit formation and engine ORI.

The ORI-inhibiting and deposit resistant additive of the instant invention is a reaction product prepared by reacting an alkyl-substituted phenol, an aldehyde, and a polyoxyalkylene diamine containing block copolymers with polyoxyalkylene backbones. The alkyl-substituted phenol reactant used to prepare the reaction product of the instant invention is such that the alkyl substituent is preferably a $C_1$–$C_{30}$ straight or branched chain aliphatic alkyl group, more preferably a $C_{10}$–$C_{30}$ aliphatic alkyl group. Particularly preferred alkyl-substituted phenols include $C_{28}$ substituted alkylphenols, dinonylphenol, and dodecylphenol, with dodecylphenol being the most preferred aliphatic alkyl-substituted phenol reactant for use.

The aldehyde reactant used to prepare the reaction product of the instant invention may be an aliphatic aldehyde, typified by formaldehyde, paraformaldehyde, and acetaldehyde, an aromatic aldehyde such as benzaldehyde, or a heterocyclic aldehyde such as furfural. The aldehyde reactant may contain a substituent group such as hydroxyl, halogen, nitro and the like. Particularly preferred aldehyde reactants for use are formaldehyde and paraformaldehyde, with paraformaldehyde being most preferred.

The polyoxyalkylene diamine reactant used to prepare the reaction product component of the instant invention is a diamine of the formula

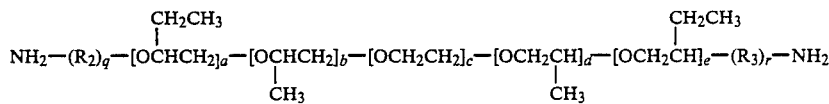

where $R_1$ and $R_2$ are $C_1$–$C_{12}$ alkylene groups, preferably $C_2$–$C_6$ alkylene groups, most preferably a propylene or butylene group, q and r are integers having a value of 0 or 1, preferably with q=1 and r=0, c has a value from about 2–150, preferably 2–50; b+d has a value from about 2–150, preferably 2–50; and a+e has a value from about 0–12, preferably 2–8. In the most preferred embodiment, q=1, r=0, $R_1$ is a butylene group and the polyoxyalkylene diamine reactant is therefore of the formula

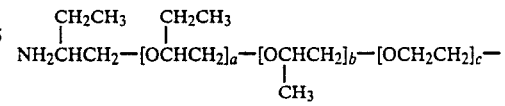

-continued

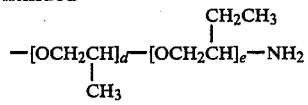

where c has a value of from 2–150, preferably 2–50, b+d has a value of from 2–150, preferably 2–50 and a+e has a value of 2–12, preferably 2–8.

In another preferred embodiment, $q=1$, $r=0$, $R_2$ is a propylene group, a+e has a value of zero, and the polyoxyalkylene diamine reactant is therefore of the formula

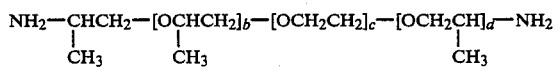

where c and b+d, respectively, have a value of from 2–150, preferably 2–50. Polyoxyalkylene diamines of the above structure suitable for use include those available from Texaco Chemical Co. under the JEFFAMINE ED-Series trade name. Specific examples of such compounds are set forth below:

| Trade Name | Approx. Value c | b + d | Approx. Mol. Wt. |
|---|---|---|---|
| ED-600 | 8.5 | 2.5 | 600 |
| ED-900 | 15.5 | 2.5 | 900 |
| ED-2001 | 40.5 | 2.5 | 2000 |
| ED-4000 | 86.0 | 2.5 | 4000 |
| ED-6000 | 131.5 | 2.5 | 6000 |

The reaction product component of the instant invention is prepared by reacting 0.5–2.5 moles, preferably about 2 moles of the abovedescribed alkyl-substituted phenol reactant, with 0.5–2.5 moles, preferably about 2 moles of the abovedescribed aldehyde reactant and 0.5–1.5 moles, preferably 1 mole of the prescribed polyoxyalkylene diamine reactant, at a temperature of 30° C.–200° C., preferably 90° C.–150° C. until all of the water has been removed from the system. The reaction is preferably carried out in the presence of a solvent. A preferred solvent is one which will distill with water azeotropically. Suitable solvents include hydrocarbons boiling in the gasoline boiling range of about 30° C. to about 200° C. Generally, this will include saturated and unsaturated hydrocarbons having from about 5 to about 10 carbon atoms. Specific suitable hydrocarbon solvents include hexane, cyclohexane, benzene, toluene, and mixtures thereof. Xylene is the preferred solvent. The solvent can be present in an amount of up to about 90% by weight of the total reaction mixture. Once the reaction has been completed, the reaction product can then be separated from the solvent using conventional means, or left in admixture with some or all of the solvent.

The following examples illustrate the preferred method of preparing the reaction product of the instant invention. It will be understood that the following examples are merely illustrative, and are not meant to limit the invention in any way. In the examples, all parts are parts by weight unless otherwise specified.

EXAMPLE I 52.2 parts of dodecylphenol, 6 parts of paraformaldehyde, 391.6 parts of xylene, and 336.3 parts of a polyoxyalkylene diamine were reacted at a temperature of about 90°–150° C. until no more water could be removed from the system. The polyoxyalkylene diamine (JEFFAMINE ED-2001) may be represented by the formula

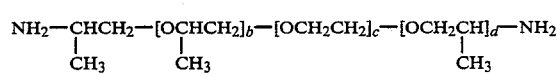

where c has an approximate value of 40.5, and b+d has an approximate value of 2.5. The reaction product was then filtered and stripped of remaining solvent under vacuum, and identified by IR, NMR, and elemental analysis. It is speculated that the structure of the reaction product of Example I may be represented as follows:

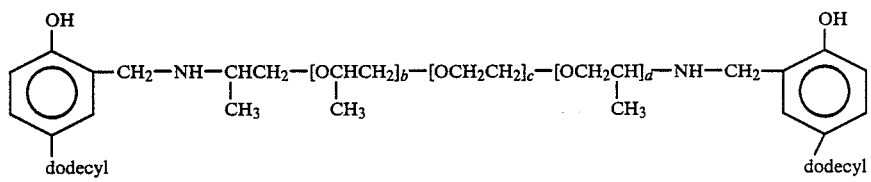

EXAMPLE II 85.6 parts of a $C_{28}$ alkylphenol, 6 parts of paraformaldehyde, 500 parts of xylene, and 336.3 parts of a polyoxyalkylene diamine were reacted at a temperature of about 90°–150° C. until no more water could be removed from the system. The polyoxyalkylene diamine (JEFFAMINE ED-2001) may be represented by the formula

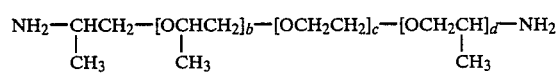

where c has an approximate value of 40.5, and b+d has an approximate value of 2.5. The reaction product was then filtered and stripped of remaining solvent under vacuum, and identified by IR, NMR, and elemental analysis.

EXAMPLE III 43.6 parts of dinonylphenol, 6 parts paraformaldehyde, 500 ml of xylene, and 336.3 parts of a polyoxyalkylene diamine were reacted at a temperature of about 90°–150° C. until no more water could be removed from the system. The polyoxyalkylene diamine (JEFFAM-INE ED-2001) may be represented by the formula

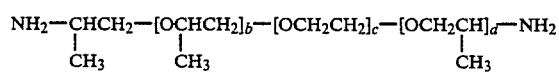

where c has an approximate value of 40.5, and b+d has an approximate value of 2.5. The reaction product was then filtered and stripped of remaining solvent under vacuum, and identified by IR, NMR, and elemental analysis.

EXAMPLE IV 520 parts of dodecylphenol, 60 parts of paraformaldehyde, 2900 parts of xylene, and 3366 parts of a polyoxyalkylene diamine are reacted at a temperature of about 90°–150° C. until no more water can be removed from the system. The polyoxyalkylene diamine is of the formula

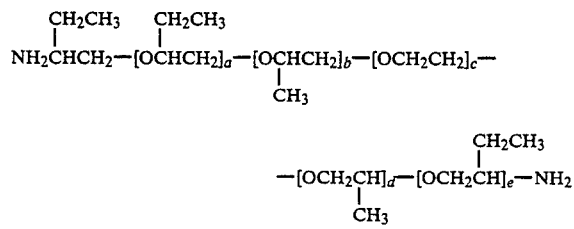

where c has an approximate value of 40.5, b+d has an approximate value of 40.5, and a+e has an approximate value of 2.5.

The motor fuel composition of the instant invention comprises a major amount of a base motor fuel and 0.0005–5.0 weight percent, preferably 0.001–1.0 weight percent of the abovedescribed reaction product. The fuel may also optionally comprise 0.001–1.0 weight percent, preferably 0.01–0.5 weight percent of the abovedescribed optional polymeric component. Preferred base motor fuel compositions are those intended for use in spark ignition internal combustion engines. Such motor fuel compositions, generally referred to as gasoline base stocks, preferably comprise a mixture of hydrocarbons boiling in the gasoline boiling range, preferably from about 90° F. to about 450° F. This base fuel may consist of straight chains or branched chains or paraffins, cycloparaffins, olefins, aromatic hydrocarbons, or mixtures thereof. The base fuel can be derived from, among others, straight run naphtha, polymer gasoline, natural gasoline, or from catalytically cracked or thermally cracked hydrocarbons and catalytically reformed stock. The composition and octane level of the base fuel are not critical and any conventional motor fuel base can be employed in the practice of this invention. An example of a motor fuel composition of the instant invention is set forth in Example V, below.

EXAMPLE V

30 PTB of the reaction product set forth in Example I (i.e. 30 pounds of reaction product per 1000 barrels of gasoline, equivalent to about 0.01 weight percent of reaction product based on the weight of the fuel composition) is blended with a major amount of a base motor fuel (herein designated as Base Fuel A) which is a premium grade gasoline essentially unleaded (less than 0.05 g of tetraethyl lead per gallon), comprising a mixture of hydrocarbons boiling in the gasoline boiling range consisting of about 22% aromatic hydrocarbons, 11% olefinic carbons, and 67% paraffinic hydrocarbons, boiling in the range from about 90° F. to 450° F.

The efficacy of the reaction product of the instant invention as an ORI-controlling additive in motor fuel compositions has been demonstrated by subjecting the reaction products exemplified by Example I, and two commercially available fuel additives (OGA-480 and OGA-472, both available from Chevron Chemical Company) to Thermogravimetric Analysis (TGA). As discussed at Col. 12, lines 30–62 of U.S. Pat. No. 4,198,306 (Lewis), incorporated herein by reference, deposit control additives showing low TGA values, i.e. more rapid thermal decomposition, have been found to show low ORI values in laboratory engine tests. The results of the TGA tests are set forth below:

| TGA Test Results | |
|---|---|
| Compound | Weight Remaining (%) after 30 min. at 295° C. |
| OGA-480 | 3.3 |
| OGA-472 | 64.6 |
| Example I | 6.6 |

It is well known to those skilled in the art that additive OGA-480 controls engine ORI but that OGA-472 tends to cause engine ORI. From the above TGA data, Example I yielded a % TGA residue value slightly greater than OGA-480 but much less than OGA-472, and therefore should have corresponding ORI-controlling properties much greater than OGA-472 but only slightly less than OGA-480. Thus, the reaction product of the instant invention has ORI-controlling properties only slightly less than a commercially available additive (OGA-472).

It has also been found that a motor fuel composition comprising a minor amount of the reaction product composition of the instant invention is effective in minimizing and reducing gasoline internal combustion engine deposits. This is an improvement in the fuel performance which may reduce the incidence of engine knock. A motor fuel composition of the instant invention was tested by the Combustion Chamber Deposit Screening Test (CCDST). In this test, the deposit-forming tendencies of a gasoline are measured. The amount of deposit formation correlates well with the ORI performance observed in car tests and engine tests. The amount of deposit is compared to a high reference (a standard gasoline known to have a high deposit formation) and a low reference (an unleaded base fuel which is known to have a low deposit formation).

The CCDST determines whether the additive in question is effective as a deposit control additive to prevent ORI. In this test, the additive sample of the reaction product composition of Example I was dissolved in Base Fuel A in a concentration of 100 PTB (100 pounds of additive per 1000 barrels of fuel, equivalent to about 0.033 weight percent of additive). In a nitrogen/hot air environment the gasoline was then atomized and sprayed onto a heated aluminum tube. After 100 minutes, the deposits which were formed on the tube were weighed. Gasolines which form larger amounts of deposits on the heated aluminum tube cause the greatest ORI when employed in an internal combustion engine. The CCDST was also employed to measure the deposit tendencies of a high reference fuel (Example H), known to yield a large deposit, and a low reference fuel (Example L), a standard unleaded gasoline known to yield a low deposit. The results are summarized below:

| Example | CCDST result (mg) |
| --- | --- |
| Instant Invention (Base Fuel A + 100 PTB Example I) | 2.8 |
| L (low reference) | 4.2 |
| H (high reference) | 11.2 |

The above results illustrate that a motor fuel composition of the instant invention was slightly superior to the low reference unleaded base fuel, and greatly superior to the high reference standard fuel, in terms of resistance to deposit formation, and consequently in terms of ORI-inhibition.

For convenience in shipping and handling, it is useful to prepare a concentrate of the reaction product of the instant invention. The concentrate may be prepared in a suitable liquid solvent such as toluene or xylene, with xylene being particularly preferred. In a preferred mode of preparing a concentrate of the instant invention, approximately 0.1–10.0, preferably 5.0–10.0 weight percent of the reaction product of the instant invention is blended with a major amount of liquid solvent, preferably xylene.

Motor fuel and concentrate compositions of the instant invention may additionally comprise any of the additives generally employed in motor fuel compositions. Thus, compositions of the instant invention may additionally contain conventional carburetor detergents, anti-knock compounds such as tetraethyl lead compounds, anti-icing additives, upper cylinder lubricating oils, and the like. In particular, such additional additives may include compounds such as polyolefin polymers, copolymers, or corresponding hydrogenerated polymers or copolymers of $C_2$–$C_6$ unsaturated hydrocarbons, or mixtures thereof. Additional additives may include substituted or unsubstituted monoamine or polyamine compounds such as alkyl amines, ether amines, and alkyl-alkylene amines or combinations thereof.

It will be evident that the terms and expressions employed herein are used as terms of description and not of limitation. There is no intention, in the use of these descriptive terms and expressions, of excluding equivalents of the features described and it is recognized that various modifications are possible within the scope of the invention claimed.

The invention claimed is:

1. A composition obtained by reacting, at a temperature of 30° C.–200° C.:
   (a) 0.5–2.5 moles of an alkyl-substituted phenol;
   (b) 0.5–2.5 moles of an aldehyde; and
   (c) 0.5–1.5 moles of a polyoxyalkylene diamine of the formula

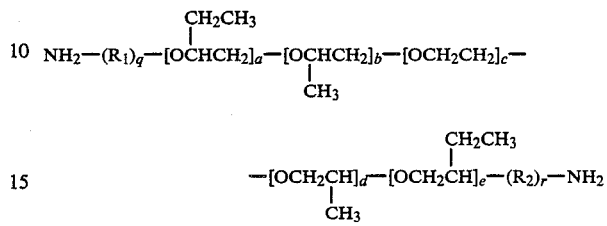

where $R_1$ and $R_2$ are $C_1$–$C_{12}$ alkylene groups, q and r are integers having a value of 0 or 1, c has a value from 2–150, b+d has a value from 2–150, and a+e has a value from 2–12.

2. A composition according to claim 1, where the alkyl substituent of said alkyl-substituted phenol is a $C_{10}$–$C_{30}$ alkyl group.

3. A composition according to claim 1, where the alkyl substituent of said alkyl-substituted phenol is a $C_{28}$ alkyl group.

4. A composition according to claim 1, where said alkyl-substituted phenol is dodecylphenol.

5. A composition according to claim 1 where said alkyl-substituted phenol is dinonylphenol.

6. A composition according to claim 1, where said aldehyde is selected from the group consisting of formaldehyde and paraformaldehyde.

7. A composition according to claim 1, where said polyoxyalkylene diamine reactant is of the formula

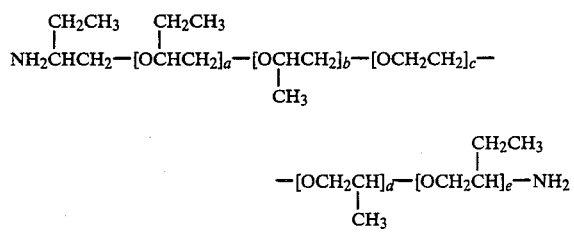

where c has a value from about 2–50, b+d has a value from about 2–50, and a+e has a value from about 2–8.

8. A motor fuel composition comprising a mixture of hydrocarbons boiling in the range from about 90° F.–450° F. and additionally comprising from 0.0005–5.0 weight percent of the reaction product obtained by reacting, at a temperature of 30° C.–200° C.:
   (a) 0.5–2.5 moles of an alkyl-substituted phenol;
   (b) 0.5–2.5 moles of an aldehyde; and
   (c) 0.5–1.5 moles of a polyoxyalkylene diamine of the formula

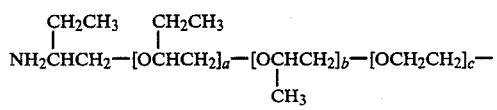

-continued

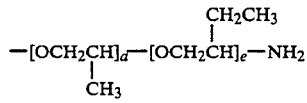

where c has a value from about 2–50, b+d has a value from about 2–50, and a+e has a value from about 2–8.

9. A motor fuel composition comprising a mixture of hydrocarbons boiling in the range from about 90° F.–450° F. and additionally comprising from 0.0005–5.0 weight percent of the reaction product obtained by reacting, at a temperature of 30° C.–200° C.:
(a) 0.5–2.5 moles of a dodecylphenol;
(b) 0.5–2.5 moles of paraformaldehyde; and
(c) 0.5–1.5 moles of polyoxyalkylene diamine of the formula

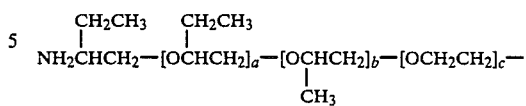

where c has a value from about 2–50, b+d has a value from about 2–50, and a+e has a value from about 2–8.

* * * * *